(12) United States Patent
Raniere

(10) Patent No.: US 9,646,311 B2
(45) Date of Patent: May 9, 2017

(54) ELECTRONIC COURSE EVALUATION

(75) Inventor: Keith A. Raniere, Clifton Park, NY (US)

(73) Assignee: FIRST PRINCIPLES, INC., Albany, NY (US)

(*) Notice: Subject to any disclaimer, the term of this patent is extended or adjusted under 35 U.S.C. 154(b) by 935 days.

(21) Appl. No.: 10/358,902

(22) Filed: Feb. 4, 2003

(65) Prior Publication Data
US 2004/0152064 A1 Aug. 5, 2004

(51) Int. Cl.
*G09B 7/00* (2006.01)
*G06Q 30/02* (2012.01)

(52) U.S. Cl.
CPC .............. *G06Q 30/02* (2013.01); *G09B 7/00* (2013.01)

(58) Field of Classification Search
USPC ....... 434/322, 323, 350, 219; 705/11; 725/9, 725/16
See application file for complete search history.

(56) References Cited

U.S. PATENT DOCUMENTS

| | | | |
|---|---|---|---|
| 4,764,120 A * | 8/1988 | Griffin et al. | 434/336 |
| 4,926,255 A | 5/1990 | Von Kohorn | |
| 5,294,229 A | 3/1994 | Hartzell et al. | |
| 5,303,042 A * | 4/1994 | Lewis et al. | 348/14.01 |
| 5,458,494 A * | 10/1995 | Krohn et al. | 434/336 |
| 5,566,291 A * | 10/1996 | Boulton et al. | 715/709 |
| 5,724,357 A | 3/1998 | Derks | |
| 5,795,155 A | 8/1998 | Morrel-Samuels | |
| 5,810,605 A | 9/1998 | Siefert | |
| 5,860,023 A | 1/1999 | Tognazzini | |
| 6,002,915 A | 12/1999 | Shimizu | |
| 6,024,577 A * | 2/2000 | Wadahama et al. | 434/322 |
| 6,155,840 A * | 12/2000 | Sallette | 434/323 |
| 6,157,808 A | 12/2000 | Hollingsworth | |
| 6,164,974 A | 12/2000 | Carlile et al. | |
| 6,208,832 B1 | 3/2001 | Remschel | |
| 6,282,404 B1 | 8/2001 | Linton | |
| 6,311,190 B1 | 10/2001 | Bayer et al. | |
| 6,325,632 B1 * | 12/2001 | Chao et al. | 434/322 |
| 6,505,031 B1 * | 1/2003 | Slider et al. | 434/350 |
| 6,789,047 B1 * | 9/2004 | Woodson | 702/182 |
| 2002/0177115 A1* | 11/2002 | Moskowitz et al. | 434/350 |
| 2003/0017443 A1 | 1/2003 | Kilgore | |

(Continued)

OTHER PUBLICATIONS

Layne et al. "Electronic Versus Traditional Student Ratings of Instruction", Research in Higher Education, vol. 40, No. 2, 1999.*

(Continued)

*Primary Examiner* — Robert J Utama
(74) *Attorney, Agent, or Firm* — Schmeiser, Olsen & Watts, LLP

(57) ABSTRACT

A method, apparatus, questionnaire, and system for evaluating student(s), teacher(s), and a course(s). A participant enters data into a device. A participant is a student or a teacher. The data reflect a response by the participant to at least one item that is presented to the participant. The at least one item relates to at least one session of the course. The at least one session is taught to the participant by a teacher. The data may include teacher data relating to the teacher(s), student data relating to the student(s), course data relating to the course(s), or combinations thereof.

2 Claims, 8 Drawing Sheets

(56) References Cited

U.S. PATENT DOCUMENTS

2003/0113698 A1\* 6/2003 Von der Geest et al. .... 434/322
2004/0002039 A1\* 1/2004 Draper et al. ............... 434/118

OTHER PUBLICATIONS

Ryan McFall, Mark Urban-Lurain, and Don Weinshank; A Web-To-Database System For Collecting Student Data; Frontiers in Education, 2002. FIE 2002. 32nd Annual; Nov. 6-9, 2002; F1E-14-F1E-18; vol. 2.; Institute of Electrical and Electronics Engineers, Inc., USA.
McFall et al "A Web-to-Database System for Collecting Student Data", Frontiers in Education, 2002, 32nd Annual, vol. 2, 2002 pp. F1E-14-F1E-18.
Chinese Office Action for Application No. 201210217626.9, mailed on Aug. 17, 2015.
Translation of Chinese Office Action Application No. 201210217626.9, mailed on Jul. 7, 2016.

\* cited by examiner

SAMPLE QUESTIONNAIRE COMPRISING EVALUATION ITEMS

| | EVALUATION ITEM | A | B | C | D | E |
|---|---|---|---|---|---|---|
| 1. | HOW EFFECTIVELY DID THE TEACHER COMMUNICATE? | O | O | O | O | O |
| 2. | HOW KNOWLEDGEABLE WAS THE TEACHER AS TO COURSE SUBJECT MATTER? | O | O | O | O | O |
| 3. | HOW EFFECTIVE WAS THE TEACHER IN SUSTAINING STUDENT INTEREST? | O | O | O | O | O |
| 4. | HOW MUCH DID YOU LEARN? | O | O | O | O | O |
| 5. | HOW MUCH WERE DID YOU ENJOY THE SESSION(S)? | O | O | O | O | O |
| 6. | HOW EFFECTIVE WAS YOUR NOTE TAKING? | O | O | O | O | O |
| 7. | HOW APPROPRIATE WAS THE SUBJECT MATTER? | O | O | O | O | O |
| 8. | HOW EFFECTIVE WERE THE COURSE MATERIALS? | O | O | O | O | O |
| 9. | RATE ENVIRONMENTAL CONDITIONS (LIGHTING, SEATING, TEMPERATURE, ETC.) | O | O | O | O | O |

*FIG. 5*

RESPONSE TO QUESTIONNAIRE COMPRISING EVALUATION ITEMS

|   | EVALUATION ITEM | A | B | C | D | E |
|---|---|---|---|---|---|---|
| 1. | HOW EFFECTIVELY DID THE TEACHER COMMUNICATE? | ○ | ○ | ○ | ● | ○ |
| 2. | HOW KNOWLEDGEABLE WAS THE TEACHER AS TO COURSE SUBJECT MATTER? | ○ | ○ | ○ | ○ | ● |
| 3. | HOW EFFECTIVE WAS THE TEACHER IN SUSTAINING STUDENT INTEREST? | ○ | ○ | ● | ○ | ○ |
| 4. | HOW MUCH DID YOU LEARN? | ○ | ○ | ● | ○ | ○ |
| 5. | HOW MUCH WERE DID YOU ENJOY THE SESSION(S)? | ○ | ○ | ○ | ● | ○ |
| 6. | HOW EFFECTIVE WAS YOUR NOTE TAKING? | ○ | ● | ○ | ○ | ○ |
| 7. | HOW APPROPRIATE WAS THE SUBJECT MATTER? | ○ | ○ | ● | ○ | ○ |
| 8. | HOW EFFECTIVE WERE THE COURSE MATERIALS? | ● | ○ | ○ | ○ | ○ |
| 9. | RATE ENVIRONMENTAL CONDITIONS (LIGHTING, SEATING, TEMPERATURE, ETC.) | ○ | ○ | ○ | ○ | ● |

FIG. 6

| D | E | C | C | D | B | C | A | E |
|---|---|---|---|---|---|---|---|---|

FIG. 7

ILLUSTRATIVE QUESTIONNAIRE COMPRISING EVALUATION ITEMS

1. OVERALL EFFECT OF SESSION(S)
   1- NO EFFECT
   2- LEARNED AT LEAST 1 THING
   3- FOOD FOR THOUGHT
   4- NEW UNDERSTANDING OF SUBJECT MATTER
   5- CHANGED MY WORLD VIEW
   6- PROFOUNDLY CHANGED MY LIFE

2. STUDENTS BENEFITING FROM SESSION(S)
   1- NONE
   2- FEW
   3- SOME
   4- MANY
   5- MOST
   6- ALL

3. TEACHER'S KNOWLEDGE OF MATERIAL
   1- NONE
   2- KNOWS SOME MATERIAL
   3- KNOWS ALL OF MATERIAL
   4- CAN ADD TO SOME OF MATERIAL
   5- CAN ADD TO MOST OF MATERIAL
   6- FLUENT IN MATERIAL

4. TEACHER'S ENTHUSIASM
   1- NONE
   2- MINIMAL
   3- SOME
   4- QUITE
   5- HIGHLY
   6- RIVETING

5. TEACHER'S UTILIZATION OF MATERIAL
   1- DETRACTED
   2- NONE
   3- SLIGHTLY ENHANCED
   4- ENHANCED
   5- GREATLY ENHANCED
   6- LIFE CHANGING

*FIG. 8*

ELECTRONIC COURSE EVALUATION

BACKGROUND OF THE INVENTION

1. Technical Field

The present invention relates to course data and electronic processing thereof.

2. Related Art

Evaluation of a course, its teacher, and its students is important for facilitating improvement of future instances of the course and for facilitating improvement of teacher and/or student effectiveness. Unfortunately, the processing of such an evaluation is typically inefficient, which limits the benefits that may be obtained from the such an evaluation. Accordingly, there is a need for an efficient processing of an evaluation of a course, its students and its teacher.

SUMMARY OF THE INVENTION

The present invention provides a method, comprising:
entering data by a participant into a device, wherein the data reflect a response by the participant to at least one item that is presented to the participant, wherein the at least one item relates to at least one session of a course, wherein the at least one session is taught to the participant by a teacher of the course, wherein the data are selected from the group consisting of teacher data relating to the teacher, student data relating to a student of the course, course data relating to the course, and combinations thereof, and wherein the participant is selected from the group consisting of the student and the teacher.

The present invention provides an apparatus, comprising:
a device adapted to have data entered therein by a participant, wherein the data reflect a response by the participant to at least one item that is presented to the participant, wherein the at least one item relates to at least one session of a course, wherein the at least one session is taught to the participant by a teacher of the course, wherein the data are selected from the group consisting of teacher data relating to the teacher, student data relating to a student of the course, course data relating to the course, and combinations thereof, and wherein the participant is selected from the group consisting of the student and the teacher.

The present invention provides a questionnaire, comprising:
at least one item encoded within a device, wherein the at least one item comprises computer readable data, wherein the device is adapted to have data entered therein by a participant, wherein the data reflect a response by the participant to the at least one item, wherein the at least one item relates to at least one session of a course, wherein the at least one session is taught to the participant by a teacher of the course, wherein the data are selected from the group consisting of teacher data relating to the teacher, student data relating to a student of the course, course data relating to the course, and combinations thereof, and wherein the participant is selected from the group consisting of the student and the teacher.

The present invention provides a course, comprising:
at least one session that is taught to a participant by a teacher of the course, wherein the course is adapted to have data entered by the participant into a device, wherein the data is computer readable, wherein the data reflect a response by the participant to at least one item that is presented to the participant, wherein the at least one item relates to at the least one session, wherein the data are selected from the group consisting of teacher data relating to the teacher, student data relating to a student of the course, course data relating to the course, and combinations thereof, and wherein the participant is selected from the group consisting of the student and the teacher.

The present invention provides a data transmission method, comprising:
transmitting data from a device to an entity selected from the group consisting of a database, a computer, and combinations thereof, wherein the data has been entered into the device by a participant, wherein the data reflect a response by the participant to at least one item that is presented to the participant, wherein the at least one item relates to at least one session of a course, wherein the at least one session is taught to the participant by a teacher of the course, wherein the data are selected from the group consisting of teacher data relating to the teacher, student data relating to a student of the course, course data relating to the course, and combinations thereof, and wherein the participant is selected from the group consisting of the student and the teacher.

The present invention provides a system, comprising:
a database having computer readable data embedded therein, said database embedded in a computer usable medium, said database adapted to receive data transmitted thereto from a device, wherein the device is adapted to have the data entered therein by a participant, wherein the data reflect a response by the participant to at least one item that is presented to the participant, wherein the at least one item relates to at least one session of a course, wherein the at least one session is taught to the participant by a teacher of the course, wherein the data are selected from the group consisting of teacher data relating to the teacher, student data relating to a student of the course, course data relating to the course, and combinations thereof, and wherein the participant is selected from the group consisting of the student and the teacher.

The present invention provides a computer program product, comprising:
a computer usable medium having a computer readable program code embodied therein, wherein the computer readable program code comprises an algorithm adapted to be executed on a computer so as to statistically analyze aggregate data resulting in a statistical analysis of the aggregate data, wherein the aggregate data comprise data entered by a plurality of participants or a single participant a plurality of instances into at least one device, wherein the data reflect a response by the plurality of participants or the single participant to at least one item that is presented to the plurality of participants or the single participant, wherein the at least one item relates to at least one session of a course, wherein the at least one session is taught to the plurality of participants or the single participant by a teacher of the course, wherein the data are selected from the group consisting of participant data relating to the plurality of participants or the single participant, course data relating to the course, and combinations thereof, and wherein each participant of the plurality of participants or the single participant is selected from the group consisting of the teacher and a student of the course.

The present invention provides an efficient processing of an evaluation of a course, its teacher(s), and its student(s).

BRIEF DESCRIPTION OF THE DRAWINGS

FIG. 5 depicts a sample questionnaire for use with the system of FIG. 1, 2, or 3, in accordance with embodiments of the present invention.

FIG. 6 depicts a response to the sample questionnaire of FIG. 6, in accordance with embodiments of the present invention.

FIG. 7 depicts the response of FIG. 6 encoded in a file record, in accordance with embodiments of the present invention.

FIG. 8 depicts an illustrative questionnaire for use with the system of FIG. 1, 2, or 3, in accordance with embodiments of the present invention.

DETAILED DESCRIPTION OF THE INVENTION

The present invention makes use of the terms "learn", "student", "teacher" and "device." To learn comprises varying either consciously or unconsciously one's response to a given stimulus. A student comprises a living organism that can potentially learn. A teacher comprises any organism or thing that participates in a student's learning. A device comprises a transmission or recording device (or both). The device may be an analog device or a digital device. The device may be a miniature device (e.g., a miniature analog device or a miniature digital device). A miniature device is a device that is small enough to be hand-held when being used. An example of a miniature device is a personal digital assistant (PDA) as is known in the art. An example of a PDA is a PALMPILOT. The scope of the present invention includes any miniature device and any PDA. Other devices may include, inter alia, a computer, a workstation, a portable device (e.g., a laptop device or a miniature device); individual sensing device (i.e., a sensing device that is capable of sensing responses or other activity by one or more participants in a course or in any other context); clothing or a device embedded therein; accessories (e.g., eyeglass frames, necktie, hearing aid, watch, etc.); etc. The device may or may not have memory capabilities. The memory capabilities, if present, may be volatile, non-volatile, or both. The device may or may not use some or all of the memory capabilities for any given application.

Figure 1:
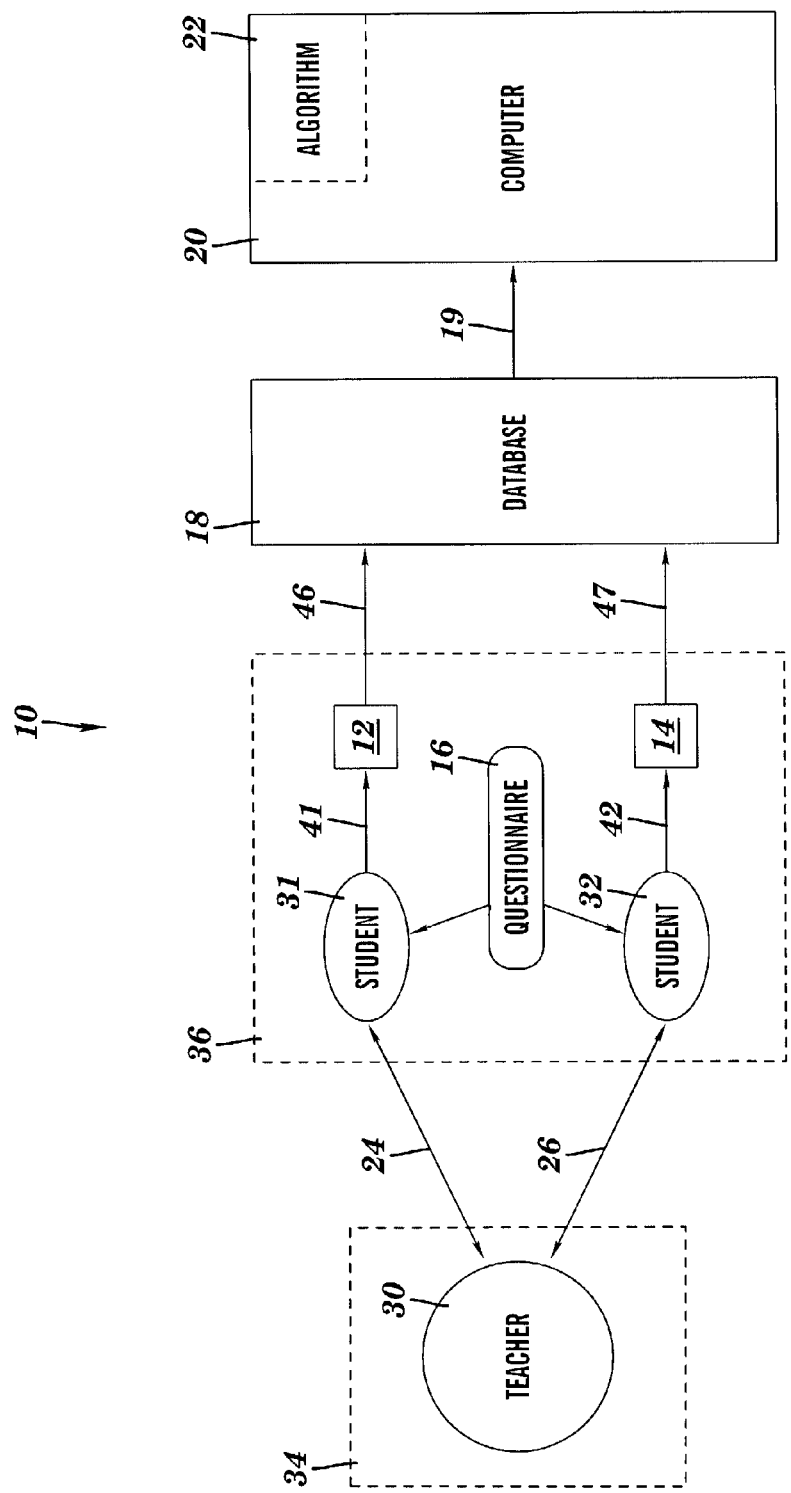
FIG. 1 depicts a system for evaluating a course, said system comprising a device, a questionnaire, a database, and a computer, in accordance with embodiments of the present invention.

FIG. 1 depicts a system 10 for evaluating a course, said system 10 comprising devices 12 and 14, a questionnaire 16, a database 18, and a computer 20, in accordance with embodiments of the present invention. The computer 20 has a stored algorithm 22 embodied in software code. The course includes a teacher 30 and students 31 and 32.

Although FIG. 1 shows one teacher (i.e., the teacher 30), the course and each session thereof may generally include any number of teachers. Although FIG. 1 shows two students (i.e., the students 31 and 32) the course and each session thereof may generally include any number of students and as few as one student.

The course is divided into sessions and each session may include, inter alia, a module of subject matter or subject activity. A session may have a fixed duration (e.g., 30 minutes, one hour, two hours, etc.) and a session may comprise any structured learning environment having at least one teacher and at least one student. Alternatively, the session may have a variable duration. The learning environment ranges from a highly structured learning environment (e.g., a formal lecture or a traditional classroom) to a loosely structured learning environment (e.g., as in a personal tutoring or counseling session or in a creative brainstorming session). Other examples of a learning environment associated with a session of a course may comprise, inter alia, a seminar, a sermon, a training session (e.g., football training or basic training in the army), a practicum (i.e., learning by doing), etc.

The learning by the students 31 and 32 in a session of the course may be of any type of learning such as, inter alia, learning traditional subject matter (e.g., mathematics, writing, science, history, geography, etc.), learning practical arts (glass blowing, carpentry, sewing, etc.), learning about interpersonal relationships (e.g., gaining an understanding of the psychology of human interactions and communication), introspective learning (e.g., a student acquires knowledge or an understanding of aspects of himself or herself), paranormal learning (e.g., improving extrasensory perception such as telepathy, clairvoyance, precognition, etc.), improving self-control (e.g., developing good habits, unlearning bad habits, meditation, etc.), improving physical performance (e.g., weight training, sports, martial arts, sexual techniques, etc.).

The teacher 30 may interact in any manner with the students 31 and 32 in their learning, and may include assisting the students 31 and 32 in their learning. The teacher 30 verbally or non-verbally directs, or provides direction to, the students 31 and 32. The students 31 and 32 receive, and may act upon, the direction provided by the teacher 30. The teacher 30 may be a traditional teacher such as in a formal classroom environment or in a lecture hall. The teacher 30 may be, inter alia, a mentor, a counselor such as a job counselor, a spiritual counselor (e.g., a priest, minister, or rabbi), a relationship counselor (e.g., a social worker, psychotherapist, etc.), a coach (e.g., a sports coach such as a football team coach or a basketball team coach; a personal development coach; a business coach, etc.), a lawyer (e.g., a lawyer teaching the students 31 and 32 about estate planning), a business or financial counselor (e.g., a certified financial planner, a tax consultant, etc.), a student functioning as a teacher, etc. The teacher 30 may be a team leader or facilitator such as in a meeting wherein the students 31 and 32 are attempting to solve a problem under the guidance of the team leader. The teacher 30 may be a guide such as in an "outward bound" program. The teacher 30 may function as a student at times during the session.

The teacher 30 may operate in any or any combination of various modes such as, inter alia, a lecture mode, a query mode, a training mode, an observation mode, or an evaluation mode. The teacher 30 may operate in a traditional lecture mode by lecturing, such that the students 31 and 32 have a passive role of listening to the teacher 30 and acquiring knowledge of the lecture material presented by the teacher 30. The teacher 30 may operate in a query mode by asking questions of the students 31 and 32, such that the students 31 and 32 have a dynamic role of responding to the questions. The teacher 30 may operate in a training mode by directing the students 31 and 32 to act in a specified manner (e.g., to engage in the steps of a physical exercise or to visualize specified images), such that the students 31 and 32 have a dynamic role of acting in said specified manner. The teacher 30 may operate in an observation mode such as by collecting and recording data (mentally, by computer, or by any other applicable means) with respect to any applicable functionality (e.g., rate of learning, depth of learning, study habits, communication skills, memory skills, analysis skills, etc.) relating to the students 31 and 32. The teacher 30 may operate in an evaluation mode by evaluating the students 31 and 32 with respect to the data obtained from the observation mode or with respect to relevant data obtained from any other source. The teacher 30 may provide feedback the students 31 and 32 as to the results of said evaluating.

The preceding examples of the teacher 30 are merely illustrative of the numerous ways in which a teacher may "teach" a session to the students 31 and 32. Hence, "teaching" by the teacher encompasses a multitude of possible activities by the teacher 30 including, but not limited to, traditional teaching. For example, the teacher 30 is not limited to a person and may include other possibilities such as, inter alia, a video (e.g., a video featuring various scenes for evoking responses from the students 31 and 32), written materials (e.g., a worksheet), a computer, a website, etc. Note that another student may function as the teacher 30. Any, some, or all of the student(s) and/or teacher(s) may be interconnected with each other or one another through any network known to one of ordinary skill in the art such as, inter alia, the Internet, an Intranet, etc.

FIG. 1 shows the teacher 30 in a location 34 and the students 31 and 32 in a location 36. The location 34 and the location 36 may be the same location such as, inter alia, a same room. Alternatively, the location 34 and the location 36 may be different locations (e.g., the location 34 may be a room in Chicago while the location 36 may be a room in Denver, such that the teacher 30 communicates by video conference or teleconference during a session of the course with the students 31 and 32). Thus, while FIG. 1 shows the students 31 and 32 in the same location 36, the students 31 and 32 may alternatively be in different locations.

A session of the course is said to be taught "non-remotely" by the teacher 30 to the student 31 when the teacher 30 and the student 31 are in the same location. A session of the course is said to be taught "remotely" by the teacher 30 to the student 31 when the teacher 30 and the student 31 are in different locations. Note that it is possible for the session to be taught non-remotely to the student 31 and remotely to the student 32 (e.g., the teacher 30 and the student 31 may be in the same room while the student 32 may be in a different room during the session of the course). If a session is mentioned herein to be taught remotely without specifying any specific student to whom the session is being taught remotely, then it is understood herein that the session is taught remotely to at least one student in the session. Similarly, if a session is mentioned herein to be taught "non-remotely" without specifying any specific student to whom the session is being taught non-remotely, then it is understood herein that the session is taught non-remotely to at least one student in the session. Thus a session may be taught only remotely, only non-remotely, or both remotely and non-remotely.

A session of the course is said to be taught "live" by the teacher 30 to the student 31 when the teacher 30 and the student 31 are in live communication with each other while the session is being taught (e.g., when the teacher 30 is a person and both the teacher 30 and the student 31 are in live communication by being physically present in the same room or by communicating by teleconference during the session or by communicating over the Internet). A session of the course is said to be taught "off line" by the teacher 30 to the student 31 when the teacher 30 and the student 31 are not in live communication with each other while the session is being taught (e.g., when the teacher 30 has videotaped a lecture and the student 31 views and listens to the videotape during the session, when the teacher 30 is a computer or written materials, etc.). Note that it is possible for the session to be taught live to the student 31 and off line to the student 32. If a session is mentioned herein to be taught live without specifying any specific student to whom the session is being taught live, then it is understood herein that the session is taught live to at least one student in the session. Similarly, if a session is mentioned herein to be taught off line without specifying any specific student to whom the session is being taught off line, then it is understood herein that the session is taught off line to at least one student in the session. Thus a session may be taught only live, only off line, or both live and off line.

FIG. 1 shows a communication path 24 between the teacher 30 and student 31, and a communication path 26 between the teacher 30 and student 32. The communication path 24 is shown in FIG. 1 to point from the teacher 30 to the student 31 and also from the student 31 to the teacher 30, which indicates a bidirectional communication. For some sessions, however, the communication may be unidirectional from the teacher 30 to the student 31 only (e.g., in a lecture by the teacher with no questions or comments from the student permitted; in a videotape playback of the teacher's lecture). Similarly, the communication path 26 is shown in FIG. 1 to point from the teacher 30 to the student 32 and also from the student 32 to the teacher 30, which indicates a bidirectional communication. For some sessions, however, the communication may be unidirectional from the teacher 30 to the student 32 only, or unidirectional from the student 32 to the teacher 30 only. Generally, the communication may be bidirectional, unidirectional, or both.

The concepts "teacher" and "student" are dynamic concepts. In a given session, for example, a person may function as both a teacher and student at different times during the session, depending on the functional role of the person in relation to the roles of the other session participants at the different times during the session.

In FIG. 1, a questionnaire 16 includes items that relate to at least one session of the course. An item comprises computer readable data relating to evaluating the teacher or teachers (e.g., the teacher 30), the course, or the students (e.g., the students 31 and 32). FIGS. 5 and 8, discussed infra, depict examples of the questionnaire 16 and the items included therein. FIGS. 5 and 6 show that an item prompts the students 31 and 32 for a response to the item. Such responses by a student to items generate data. The students 31 and 32 in FIG. 1 may each be requested to provide data in relation to said at least one session of the course that was taught to the students 31 and 32 by the teacher 30. The data may include: teacher data relating to the teacher, student data relating to the student, course data relating to the course, or combinations thereof. The data may also include participant data relating to a plurality of participants or to a single participant, course data relating to the course, and combinations thereof, wherein each participant of the plurality of participants or the single participant is a teacher or student of the course.

As shown in FIG. 1, the students 31 and 32 each enter such data into a device 12 and 14, respectively. Thus, the data so entered into the device 12 by the student 31 reflects a response by the student 31 to at least one item that is presented to the student 31. Similarly, the data so entered into the device 14 by the student 32 reflects a response by the student 32 to at least one item that is presented to the student 32. The student 31 enters data into the device 12 over a transmission path 41. The transmission path 41 may comprise a path from the student 31 to data entry buttons of the device 12. Similarly, the student 32 enters data into the device 14 over a transmission path 42. The transmission path 42 may comprise a path from the student 32 to data entry buttons of the device 14.

The preceding discussion disclosed the students 31 and 32 entering the data into the devices 12 and 14. Nonetheless, the teacher 30 may additionally or alternatively enter data about the students, other teachers, the course, or combinations thereof, into a device such as the device 12 or 14. Thus, a first person could be evaluated by a second person in a same role (e.g., in a teacher role or in a student role). Alternatively, a first person could be evaluated by a second person in a different role (e.g., a student evaluating a teacher, or a teacher evaluating a student). Generally, a participant in the least one session may enter data into a device (e.g., the device 12), wherein the participant is a student (e.g., the student 31) or a teacher (e.g., the teacher 30).

The data entered into the device 12 or 14 may be stored in a non-volatile memory portion of the device 12 or 14, which means that the stored data will continue to exist in the device 12 or 14 when power to the device 12 or 14 is disabled. The data entered into the device 12 or 14 may be stored in a volatile memory portion of the device 12 or 14, which means that the stored data will no longer exist in the device 12 or 14 when power to the device 12 or 14 is disabled. Alternatively, the data entered into the device 12 or 14 may be not stored in a memory portion of the device 12 or 14, but directly transmitted to an external destination (e.g., an external database or computer) for subsequent analysis (e.g., statistical analysis). As stated supra, the device 12 or 14 may not have a memory and may not be capable of recording data, or the device 12 or 14 may have memory and/or recording capabilities which are not utilized for the data entered into the device 12 or 14.

The devices 12 and 14 may be a same device or different devices. Thus, an analog device (e.g., a tape recorder) may be utilized for either or both of the devices 12 and 14. The devices 12 and 14 may each comprise a computer usable medium with embedded computer readable program code, embedded computer readable data, or both. The devices 12 and 14 may each include a data transmission mode for transmitting data to an external destination following entry of said data (e.g., by a user, by an external device, etc.) into said devices 12 and 14, and such entered data may either be recorded or not be recorded (by control of hardware, software, the user, etc.) within said devices 12 and 14.

In FIG. 1, the data entered into the devices 12 and 14 may be transmitted over transmission paths 46 and 47, respectively, to a database 18 that is accessible to a computer 20 through communication path 19. The transmission paths 46 and 47 may each comprise, inter alia, cable lines, telephone lines, satellite transmissions, the Internet, radio frequency transmission, laser radiation transmission at a suitable frequency, etc. Said data may be transmitted via transmission paths 46 and 47 in real time (i.e., upon or immediately after entry of the data into the devices 12 and 14) or after a period of storage in the devices 12 and 14. Additionally, the database 18 may be updated in real time with the data so transmitted (i.e., the database 18 may updated upon receipt of the data). The database 18 generally refers to a repository for storing the transmitted data. Accordingly, the database 18 may hold the transmitted data in the form of, inter alia, tables, relational database, spreadsheets, files, etc. The database 18 may have computer readable data embedded therein, and the database 18 may be embedded in a computer usable medium. Although FIG. 1 shows the database 18 as being coupled to the computer 20, the database 18 may be located either external to a computer system (e.g., the computer system 90 depicted in FIG. 9) comprising the computer 20, or within a computer system comprising the computer 20.

The computer 20 may be a remote computer, a non-remote computer, or a partially remote computer. The computer 20 is said to be a non-remote computer relative to the student 31 if the student 31 and the computer 20 are in a same location. The computer 20 is said to be a remote computer relative to the student 31 if the student 31 and the computer 20 are in different locations. The computer 20 is said to be a partially remote computer if the computer 20 is a remote computer relative to the student 31 and is a non-remote computer relative to the student 32. If the computer 20 is mentioned herein as a remote computer without reference to any specific student in a session, then it is understood herein that the computer 20 is a remote computer relative to at least one student in the session. Similarly, if the computer 20 is mentioned herein as a non-remote computer without reference to any specific student in a session, then it is understood herein that the computer 20 is a non-remote computer relative to at least one student in the session. If the computer 20 is not identified herein (specifically or impliedly) as a remote computer, a non-remote computer, or a partially remote computer, then the computer 20 may be a remote computer, a non-remote computer, or a partially remote computer.

The computer 20 comprises an algorithm 22 in the form of software code that processes the aggregate data in the database 18. The aggregate data is the composite data entered by at least two students such as the students 31 and 32, by a plurality of participants, or by a single participant a plurality of instances into at least one device. The algorithm 22 may analyze said aggregate data statistically, resulting in a statistical analysis of the aggregate data. For example, the algorithm 22 may calculate a mean and standard deviation selected data. The algorithm 22 may include normalizing the data of one or more students, of said plurality of participants, or of said single participant, in accordance with a statistical criterion. For example, if the data entered by a given student is highly biased (e.g., the teachers are consistently rated very favorably by the given student), then such teacher ratings of said data of the given student may be lowered by the algorithm 22 to conform to average teacher ratings of other students.

The statistical analysis of the aggregate data may be used in many ways. As a first example, said statistical analysis may be utilized for determining whether the teacher will teach a subsequent session of the course. Said teacher may have been scheduled prior to the statistical analysis to teach the subsequent session of the course. Said teacher may have been scheduled prior to the statistical analysis to teach the subsequent session of the course within a short period (e.g., 10 minutes, 1 hour, 24 hours, a week, etc., depending on need) after the end of the at least one session of the course.

As a second example, said statistical analysis may be utilized for determining how each teacher is being rated. As a third example, said statistical analysis may be utilized for determining how much the students like different courses or different sessions of the course. As a fourth example, said statistical analysis may be utilized for determining effectiveness of a course or a session thereof as a function of the student location 36 (e.g., a given course or session thereof may be more effective in Florida than in Massachusetts). As a fifth example, said statistical analysis may be utilized for determining effectiveness of a course or a session thereof as a function of the time of day at which the course is taught (e.g., morning, afternoon, evening, 3:00 PM-5:00 PM, 8:00 AM, 10:00 PM, etc.). As a sixth example, said statistical analysis may be utilized for determining which teacher of several teachers is best suited to teach a given group of students. As a seventh example, said statistical analysis may be utilized for identifying a given teacher's strengths and weaknesses. As a eighth example, said statistical analysis may be utilized for determining which teacher of several teachers is best suited to teach a course session: of given subject content, in a given geographical location, at a particular time during the day, to students predominantly of a given gender, to students of a given age category, combinations thereof, etc. As an ninth example, said statistical analysis may be utilized for strengthening a curriculum of courses by modifying the curriculum and/or course material to reflect said statistical analysis.

If the entered data is transmitted to the database 18 in real time and the database 18 is updated in real time, then the statistical analysis of the aggregate data may be performed by the algorithm 22 in real time and therefore utilized in particular ways. With such real-time transmission and processing of the aggregate data, problems could be identified "on the fly" so that corrective action could be taken quickly. As a first example, if multiple sessions of the course are scheduled during a given day, and as sessions of the course are progressing during the given day, the real-time statistical analysis could be utilized to change subject matter of sessions, change teachers, etc. to improve course performance for the given day. As a second example, if a teacher is getting bad ratings during the given day, said teacher can be replaced in subsequent sessions of the given day by a different teacher. As a third example, if processing the data indicates that a given student appears to be burnt out, then said student can be placed in a less demanding subsequent session during the given day.

Figure 2:
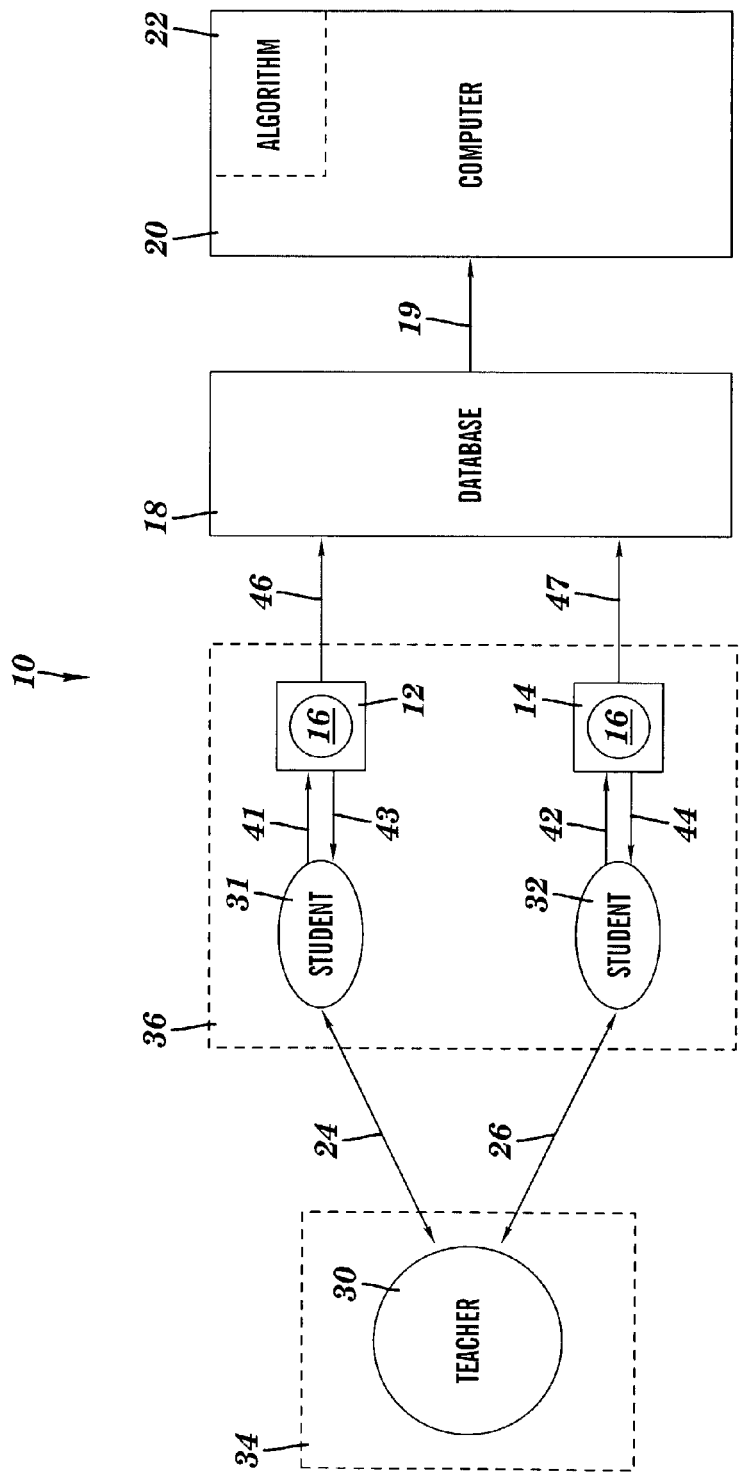
FIG. 2 depicts the system of FIG. 1 with the questionnaire encoded within the device, in accordance with embodiments of the present invention.

FIG. 1 depicts the questionnaire 16 as being external to the devices 12 an 14. In contrast, FIG. 2 depicts the system 10 of FIG. 1 with the questionnaire 16 encoded within the devices 12 an 14, in accordance with embodiments of the present invention. The student 31 may have access to the questionnaire 16 through any means known to one of ordinary skill in the art such as through the transmission path 43 from device 12. Similarly, the student 32 has access to the questionnaire 16 through the transmission path 44 from device 14. In all other respects, FIG. 2 has the same features and functionality as does FIG. 1.

Figure 3:
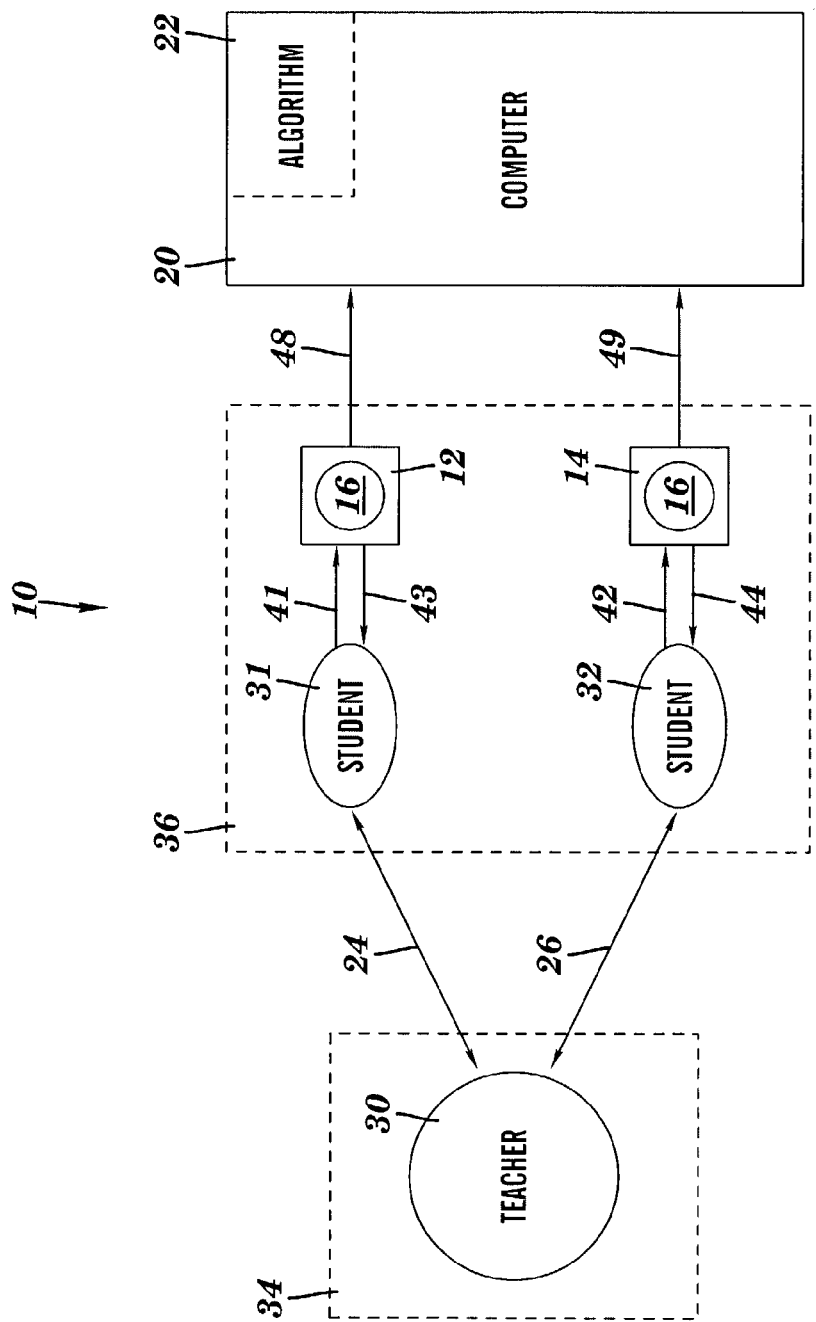
FIG. 3 depicts the system of FIG. 2 without the database, in accordance with embodiments of the present invention.

FIG. 3 depicts the system 10 of FIG. 2 without the database 18, in accordance with embodiments of the present invention. In FIG. 3, data is transmitted over the transmission paths 48 and 49 from the devices 12 and 14, respectively, to the computer 20 where said transmitted data are stored in a memory portion of, or in a peripheral memory device coupled to, the computer 20 (instead of in the database 18 of FIG. 2), such that said stored data may be processed and statistically analyzed by the algorithm 22. The transmission paths 48 and 49 may each comprise, inter alia, cable lines, telephone lines, satellite transmissions, the Internet, radio frequency transmission, laser radiation transmission at a suitable frequency, etc. Said data may be transmitted via transmission paths 48 and 49 in real time (i.e., upon or immediately after entry of the data into the devices 12 and 14) or after a period of storage in the devices 12 and 14. Although the questionnaire 16 in FIG. 3 is encoded within the devices 12 and 14, the questionnaire 16 may alternatively be located external to the devices 12 an 14 as in FIG. 1. In all other respects, FIG. 3 has the same features and functionality as does FIG. 2.

Figure 4:
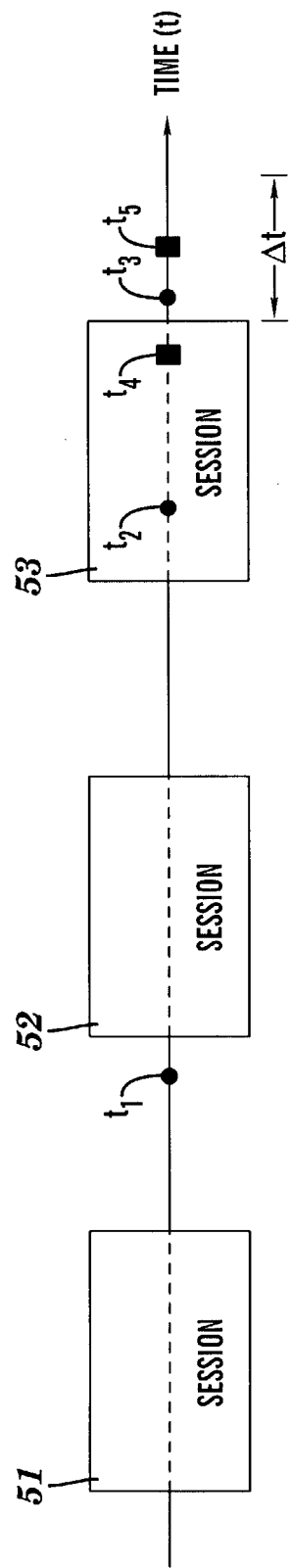
FIG. 4 depicts a timeline for the system of FIG. 1, 2, or 3, in accordance with embodiments of the present invention.

FIG. 4 depicts a timeline for the system 10 of FIGS. 1-3, in accordance with embodiments of the present invention. In FIG. 4, sessions 51, 52, and 53 of a course are depicted as occurring sequentially time t increases. Sessions 52 and 53 collectively constitute the at least one session for which data is entered by the students 31 and 32 into the devices 12 and 14, respectively, in FIGS. 1-3. The items of the questionnaire 16 to which said data is associated may be presented to the students 31 and 32: prior to the at least one session (e.g., at time $t_1$ in FIG. 3); during the at least one session (e.g., at time $t_2$ in FIG. 3); or after the at least one session (e.g., at time $t_3$ in FIG. 3). Said data may be entered into the devices 12 and 14: prior to the end of the at least one session (e.g., at time $t_4$ in FIG. 3); or within a time interval $\Delta t$ following the end of the at least one session. As an example $\Delta t$ may have a value of, inter alia, ½ minute, 1 minute, 5 minutes, 10 minutes, or 30 minutes.

FIG. 5 depicts a sample questionnaire for use with the system of FIG. 1, 2, or 3 for a course having a teacher and students, in accordance with embodiments of the present invention. The sample questionnaire of FIG. 5 may be used for course evaluations for at least one session of the course. The sample questionnaire of FIG. 5 depicts 9 evaluation items on the sample questionnaire. Items 1-3 relate to the teacher, items 4-6 relate to the students, and items 7-9 relate to the course. The students' responses to the items 1-3 generate teacher data relating to the teacher. The students' responses to the items 4-6 generate student data relating to the student. The students' responses to the items 7-9 generate course data relating to the course. The students' responses to items 1-9 are recorded for each item as A, B, C, D, or E as shown, wherein A, B, C, D, and E are in order of increasing positive response such that "A" means least positive and "E" means most positive. Note that the letters A, B, C, D, and E are arbitrary symbols and any other symbols may be used for the responses. For example, the numbers 1, 2, 3, 4, and 5 may be used instead of A, B, C, D, and E, respectively (as illustrated infra in conjunction with FIG. 8). Such use of numbers allows the algorithm 22 of FIGS. 1-3 to perform numerical computations (e.g., statistical analyses) using the numerical responses 1, 2, 3, 4, and 5. While FIG. 5 shows five possible responses for each item, at least two possible responses (e.g., A/B; Yes/No; etc.) are generally required for each item. Additionally, the form of the possible responses may be any form known to a person of ordinary skill in the art of questionnaires. The scope of the present invention includes use of a single questionnaire or of multiple questionnaires.

FIG. 6 depicts responses to the sample questionnaire of FIG. 5, in accordance with embodiments of the present invention, wherein a blackened circle (i.e., ●) denotes a student's response selected from the possible responses. FIG. 7 depicts the responses of FIG. 6 encoded in a file record 58, in accordance with embodiments of the present invention.

FIG. 8 depicts an illustrative questionnaire for use with the system of FIG. 1, 2, or 3 for a course having a teacher and students, in accordance with embodiments of the present invention. The illustrative questionnaire of FIG. 8 may be used for course evaluations for at least one session of the course. The sample questionnaire of FIG. 8 depicts 5 items on the illustrative questionnaire; i.e, items: "Overall Effect of Session(s)", "Students Benefiting From Session(s)", . . . , "Teacher's Utilization of Material." items 1-2 relate to the students, items 3-5 relate to the teacher, and no items on FIG. 8 relate to the course. The students' responses to the items 1-2 generate student data relating to the student. The students' responses to the items 3-5 generate teacher data relating to the teacher. The students' responses to items 1-5 are recorded for each item as 1-, 2-, 3-, 4-, and 5-, wherein 1-, 2-, 3-, 4-, and 5- are in order of increasing positive response such that "1-" means least positive and "5-" means most positive. Note that the letters A, B, C, D, and E are arbitrary symbols and any other symbols may be used for the responses. Each such item in FIG. 8 has 6 possible responses denoted by the numbers 1, 2, 3, 4, 5, and 6. The student may denote his or her response to an item by, inter alia, circling one of the numbers 1, 2, 3, 4, 5, and 6. The illustrative questionnaire of FIG. 8 is analogous to the sample questionnaire of FIG. 5 and is in a different format than is the sample questionnaire of FIG. 5.

Figure 9:
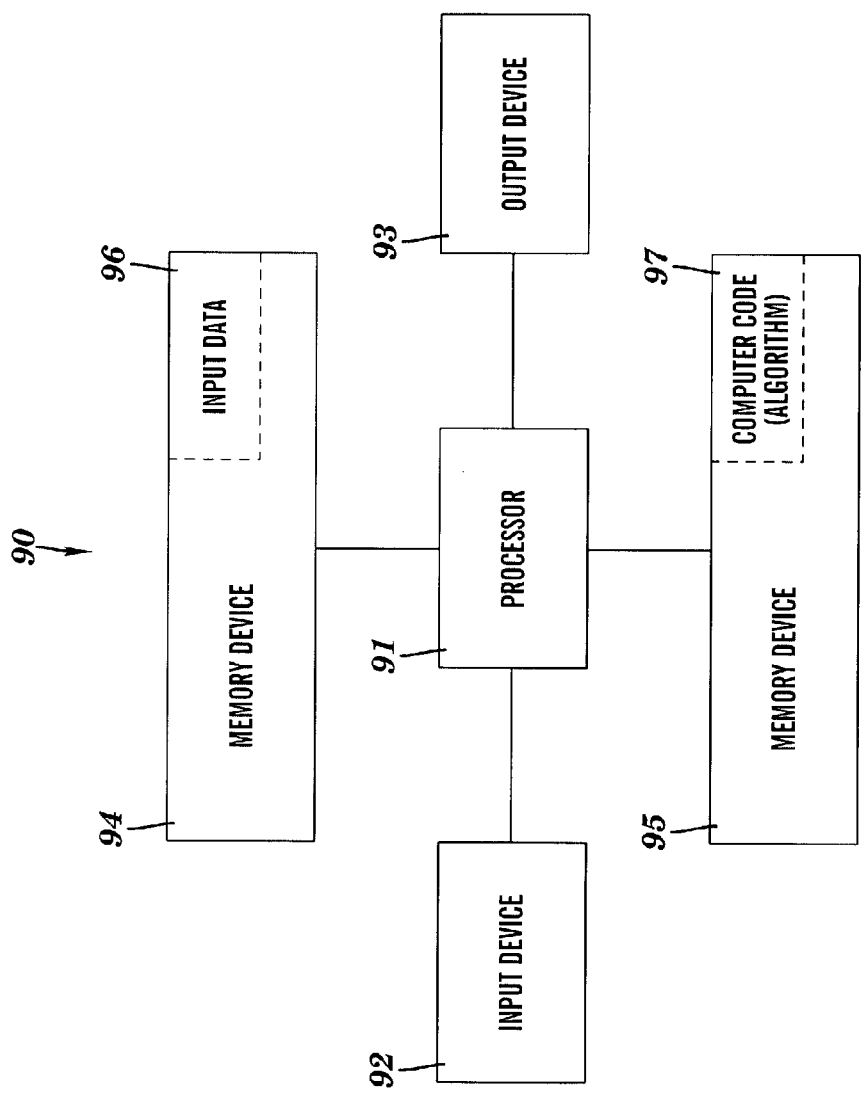
FIG. 9 depicts a computer system for evaluating a course, in accordance with embodiments of the present invention.

FIG. 9 depicts a computer system 90 for evaluating a course, in accordance with embodiments of the present invention. The computer system 90 may correspond to the computer 20 of FIGS. 1-3 with or without the database 18. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, a PDA, etc. Either of both of the memory devices 94 and 95 may store the data transmitted from the devices 12 and 14 of FIGS. 1-3. The output device 93 may be, inter alia, a printer, a plotter, a computer screen, a magnetic tape, a removable hard disk, a floppy disk, etc. The memory devices 94 and 95 may be, inter alia, a hard disk, a dynamic random access memory (DRAM), a read-only memory (ROM), etc. The memory device 95 includes a computer code 97 which includes an algorithm (e.g., the algorithm 22 of FIGS. 1-3) for processing (e.g., statistically analyzing) said transmitted data. The processor 91 executes the computer code 97. The memory device 94 includes input data 96. The input data 96 includes input required by the computer code 97. The output device 93 displays output from the computer code 97. Either or both memory devices 94 and 95 (or one or more additional memory or data storage devices not shown in FIG. 9) may be used as a computer usable medium having a computer readable program code embodied therein, wherein the computer readable program code comprises the computer code 97. If the database 18 is present in (or coupled to) the computer system 90, the database 18 may be embedded in a computer usable medium such, inter alia, either or both memory devices 94 and 95 (or one or more additional memory or data storage devices not shown in FIG. 9).

While FIG. 9 shows the computer system 90 as a particular configuration of hardware and software, any configuration of hardware and software, as would be known to a person of ordinary skill in the art, may be utilized for the purposes stated supra in conjunction with the particular computer system 90 of FIG. 9. For example, the memory devices 94 and 95 may be portions of a single memory device rather than separate memory devices.

The scope of the present invention includes each of a plurality of devices being capable of storing all of the data entered by all participant in a session, by sensing entry of said data by all of said participants. The scope of the present invention also includes each of the plurality of devices being capable of processing (e.g., statistically analyzing) said sensed data. Additionally, the plurality of devices may collectively represent a distributed network of devices capable of performing all functions described herein.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

I claim:

1. A method for processing data for evaluating a teacher of at least one session of a course, the course being taught at a first geographic location, comprising:

providing a first electronic device with a system for a selection of a mode for evaluation, the mode for evaluation being an observation mode;

initiating a questionnaire for evaluating the teacher of the course, by the first electronic device, at a start of the at least one session of the course, the questionnaire including a plurality of evaluation items relevant to the observation mode, the plurality of items relating to a performance of the teacher of the course;

receiving, by the first electronic device, data, wherein the data reflect a first response to the plurality of evaluation items of the during the at least one session of the course;

providing a second electronic device;

transmitting, by the first electronic device, the entered data in real time during the at least one session to the second electronic device, wherein the second electronic device is selected from the group consisting of a database, a computer, and combinations thereof;

updating, by the second electronic device, in real time the entered data during the at least one session transmitted by the first electronic device;

analyzing, by the second electronic device, in real time the data during the at least one session transmitted by the first electronic device during the at least one session;

receiving, by the second device, an additional data during the at least one session, wherein the additional data reflect a second response to the plurality of evaluation items, wherein an aggregate data comprise the data received by the second device and the additional data received by the second device;

statistically analyzing, by the second device executing an algorithm, the aggregate data in real time during the at least one session, resulting in a statistical analysis of the aggregate data, wherein the aggregate data is normalized in accordance with a statistical criterion;

determining, by the second electronic device, during the at least one session, an effective performance of said teacher; and displaying, with an output device coupled to the second device, during the at least one session, the effective performance of the teacher of the course based upon the data reflected by the first and second responses to at least one of the plurality of evaluation items, wherein the output device coupled to the second device is located in a second geographic location that is different from the first geographic location.

2. A method for processing data for evaluating a teacher of at least one session of a course, comprising:
>    providing a first electronic device with a system for entering data by a student;
>    initiating a questionnaire for evaluating the teacher of the course, by the first electronic device, at a start of the at least one session of the course, the questionnaire including a plurality of evaluation items;
>    receiving, by the first electronic device, the data entered by the student, wherein the data reflect a response to the plurality of evaluation items of the during the at least one session of the course;
>    providing a second electronic device;
>    transmitting, by the first electronic device, the entered data in real time during the at least one session to the second electronic device, wherein the second electronic device is selected from the group consisting of a database, a computer, and combinations thereof;
>    updating, by the second electronic device, in real time the entered data during the at least one session transmitted by the first electronic device;
>    analyzing, by the second electronic device, in real time the data during the at least one session transmitted by the first electronic device during the at least one session;
>    determining, by the second electronic device, during the at least one session, an effective performance of said teacher; and
>    displaying, with an output device coupled to the second device, during the at least one session, the effective performance of the teacher of the course based upon the data reflected by the first and second responses to at least one of the plurality of evaluation items
>    wherein the plurality of evaluation items include questions only regarding aspects of the teacher, and not an understanding level of the students.

* * * * *